United States Patent
Narutaki et al.

[11] Patent Number: 5,161,043
[45] Date of Patent: Nov. 3, 1992

[54] METHOD OF FORMING LIQUID CRYSTAL DISPLAY DEVICE WITH MOLYBDENUM SHADING LAYER OVER ITO ELECTRODES

[75] Inventors: Yozo Narutaki; Kenichi Nakagawa, both of Nara, Japan

[73] Assignee: Sharp Kabushiki Kaisha, Japan

[21] Appl. No.: 758,507

[22] Filed: Sep. 6, 1991

Related U.S. Application Data

[63] Continuation of Ser. No. 483,506, Feb. 23, 1990, abandoned.

[30] Foreign Application Priority Data

Feb. 28, 1989 [JP] Japan ................................ 1-49091

[51] Int. Cl.⁵ .................................................. G02F 1/13
[52] U.S. Cl. .......................................... 359/54; 359/67; 359/87
[58] Field of Search ............... 350/350 S, 336, 339 F, 350/333; 359/67, 87, 54

[56] References Cited

U.S. PATENT DOCUMENTS

| | | | |
|---|---|---|---|
| 4,448,637 | 5/1984 | Hiraishi et al. | 156/635 |
| 4,471,376 | 9/1984 | Morcum et al. | 357/71 |
| 4,818,078 | 4/1989 | Mouri et al. | 350/336 |
| 4,824,213 | 4/1989 | Morokawa | 359/67 |
| 4,859,036 | 8/1989 | Yamanaka et al. | 350/336 |
| 4,899,224 | 2/1990 | Ooba et al. | 359/54 |
| 4,906,072 | 3/1990 | Kaneko et al. | 350/336 |
| 4,995,942 | 2/1991 | David | 156/642 |
| 5,007,716 | 4/1991 | Hanyu et al. | 359/87 |
| 5,084,905 | 1/1992 | Sasaki et al. | 357/71 |

FOREIGN PATENT DOCUMENTS

| | | | |
|---|---|---|---|
| 0324433 | 7/1989 | European Pat. Off. | 350/336 |
| 0210325 | 9/1986 | Japan | 350/336 |
| 0227126 | 9/1989 | Japan | 350/336 |

*Primary Examiner*—Janice A. Howell
*Assistant Examiner*—Anita Pellman Gross
*Attorney, Agent, or Firm*—Nixon & Vanderhye

[57] ABSTRACT

A liquid crystal display device having a matrix of pixels includes first and second light-transmissive substrates layered so as to face each other, a plurality of belt-like row electrodes spaced in parallel to each other on the first substrate, a plurality of belt-like column electrodes spaced in parallel to each other on the second substrate, a first shading layer divided into a plurality of segments partially overlying the row electrodes, a second shading layer divided into a plurality of segments partially overlying the column electrodes, and liquid crystals interposed and sealed between the first and second substrates. Each of the segments of the first shading layer are shaped and positioned so as to be opposed to each space between the column electrodes, while each of the segments of the second shading layer are shaped and positioned so as to be opposed to each space between the row electrodes.

6 Claims, 2 Drawing Sheets

METHOD OF FORMING LIQUID CRYSTAL DISPLAY DEVICE WITH MOLYBDENUM SHADING LAYER OVER ITO ELECTRODES

This is a division of application Ser. No. 07/483,506, filed Feb. 23, 1990, now abandoned.

BACKGROUND OF THE INVENTION

1. Field of the Invention

The present invention relates to a liquid crystal display device and, more particularly to a liquid crystal display device of a matrix display type.

2. Description of the Prior Art

In recent years, with the development of information processing devices such as computers, emphasis has been placed on the role to be filled by display devices as information communicating means. The conventional typical display device was a CRT (Cathode Ray Tube). However, a liquid crystal display device is now preferred in view of the advantage of minimizing the construction and decreasing the power consumption. Further, there is a keen need for a liquid crystal display device of large screen area, and at the same time, of large capacity.

For the materialization of such a device, attention is now being paid to a liquid crystal display device utilizing ferroelectric liquid crystals. Typically, chiral smectic liquid crystals are used for ferroelectric liquid crystals. Molecules of ferroelectric liquid crystals are aligned in a helical structure under normal conditions. However, it is known that if a thickness of liquid crystal layer smaller than a helical pitch of the helical array is selected, two stable orientations can be obtained in the ferroelectric liquid crystals. These two orientations mean that, when a positive electric field, i.e., positive voltage is applied, the liquid crystal molecules are oriented in a first state of orientation, in contrast, when a negative electric field, i.e., negative voltage is applied, the liquid crystal molecules are oriented in a second state of orientation. It is also known that transition from the first state of orientation to the second one occurs extremely quickly.

In a liquid crystal display device utilizing the aforesaid ferroelectric liquid crystals, the liquid crystal molecules should be uniformly oriented in the liquid crystal layer to obtain good display properties. In practice, however, it is very difficult to obtain such a uniform orientation because disclination, i.e., various orientations of the liquid crystal molecules occurring in the same layer, or the like occur. In particular, the aforesaid two stable orientations exist in the areas other than the pixel areas and to which voltage is not applied. Consequently, bright areas and dark areas are intermingled in the display screen of the liquid crystal display device, thereby significantly deteriorating the display quality of the device.

Further, when the liquid crystal display device is driven, voltage is applied to one end of each of electrodes. If resistance of an electrode is high, voltage at the other end of the electrode is significantly lowered. As a result, voltage applied to the liquid crystal layer becomes multiform, so that the display properties of the liquid crystal device is rendered multiform. To overcome these problems, Japanese Published Unexamined Patent Application No. 11911/1988 discloses a liquid crystal display device in which a conductive shading layer covers the spaces between electrodes while at the same time one end of the layer is in contact with one side of each of the electrodes. However, in order to prevent a short circuit between one electrode and another electrode adjacent thereto, such a device is required to be so devised that (1) a microscopic space is provided between the conductive shading layer and the adjacent electrode, or (2) an insulating film is provided therebetween. In the case of (1), it is not easy to provide such a microscopic space, and if the space is enlarged, shading effect becomes incomplete. As well, in the case of (2), problems may occur in insulating properties of the insulating film, besides manufacturing process of the device becomes complicated because steps of forming the insulating film and patterning thereof must be added to the usual process.

SUMMARY OF THE INVENTION

The present invention provides a liquid crystal display device having a matrix of pixels, which comprises first and second light-transmissive substrates layered so as to face each other; a plurality of belt-like row electrodes spaced in parallel to each other on the first substrate; a plurality of belt-like column electrodes spaced in parallel to each other on the second substrate; a first shading layer divided into a plurality of segments partially overlying the row electrodes, each of the segments of the first shading layer being shaped and positioned so as to be opposed to each space between the column electrodes; a second shading layer divided into a plurality of segments partially overlying the column electrodes, each of the segments of the second shading layer being shaped and positioned so as to be opposed to each space between the row electrodes; and liquid crystals interposed and sealed between the first and second substrates.

The row and column electrodes may preferably be formed with belt-like conductive layers covering one longitudinal end portion of each electrode so as to lower the resistance of the electrodes, whereby voltage to be applied to every pixel can be made uniform for improving the liquid crystal display device in display quality thereof.

The belt-like conductive layer may be formed to cover both longitudinal end portions of each electrode.

The conductive layer and the shading layer may be separately formed. However, it is desirable that they are integrally formed of the same material to simplify the manufacturing process. It should be noted for the integral manufacturing that a material useful for the conductive and shading layers may be any material having both conductive and shading properties, for example, molybdenum, titanium, aluminum, tantalum, or the like.

According to the invention, by shading light penetrating areas other than pixel areas with the shading layer, the areas other than the pixel areas can be totally uniform in brightness. Further, the device of the invention exhibits remarkable difference in brightness between the pixel areas and the areas other than the pixel areas.

DESCRIPTION OF THE PREFERRED EMBODIMENTS

Figure 1:
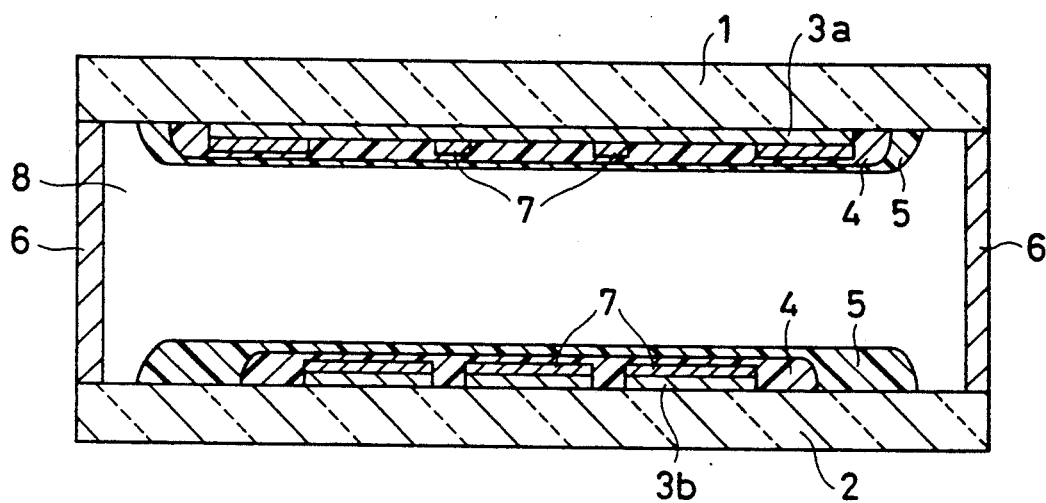
FIG. 1 is a sectional view showing the first embodiment of a liquid crystal display device in accordance with the invention.

FIG. 1 is a sectional view showing the first embodiment of a liquid crystal display device in accordance with the invention.

Hereinafter, a process for manufacturing a liquid crystal display device 10 shown in FIG. 1 will be described. First, on one face of each of two transparent glass substrates 1, 2, an ITO film (transparent conductive thin film of indium tin oxide) as electrodes 3a or 3b is uniformly formed by sputtering. Next, on the ITO film, a molybdenum compound film as a shading layer 7 is uniformly formed by sputtering. Sequentially, an etching treatment is effected to obtain a predetermined shape of the molybdenum compound film and ITO film. In this case, etching should be selectively effected by selecting a suitable etchant. That is, by using one of phosphoric acid type etchants (for example, $H_3PO_4$ : $HNO_3$ : $CH_3COOH = 80 : 5 : 15$), the molybdenum compound film is etched to be patterned, thereby forming the shading layer 7 divided into a plurality of segments. On the other hand, by using an etchant selected from hydrochloric acid type etchants (for example, HCl : $FeCl_3 = 1 : 1$), the ITO film is etched to be patterned, thereby forming the electrodes 3a or 3b. In this embodiment, width of the electrode 3a or 3b is 110 $\mu$m, space between the electrodes is 15 $\mu$m, and size of each segment of the shading layer 7 is 110 $\mu$m X 15 $\mu$m. As the glass substrates 1, 2, for example, #7059F made by CORNING CO., LTD is used.

Further, after the etching, a silicon dioxide ($SiO_2$) film of approximately 2000 Å thick as an insulating film 4 is formed by sputtering. A polyvinyl alcohol solution is then spin-coated on the insulating film 4 to form an orientation film 5. After baking, the orientation film is rubbed. The glass substrates 1, 2 are so bonded together with their electrode faces opposed to each other by using sealing material 6 that the thickness of the liquid crystal layer may be, for example, 2 $\mu$m, and the electrodes 3a and 3b may be positioned perpendicular to each other to give simple matrix electrodes. As liquid crystals 8, ferroelectric liquid crystals are injected. The ferroelectric liquid crystal useful in this embodiment may be, for example, CS-1014 (product of CHISSO PETROCHEMICAL CO. Japan), ZLI-3489 (product of E. Mersk), FELIX-006/2 (product of Hoechst), or CHIRACOL-1013 (product of ADEKA ARGUS CHEMICAL CO. Japan).

Figure 2:
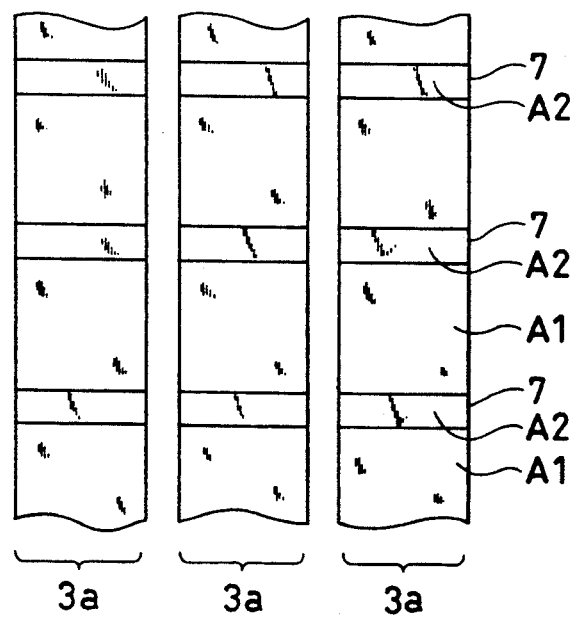
FIG. 2 is a plan view showing a shape of a shading layer in the liquid crystal display device in accordance with the invention.

FIG. 2 is a plan view showing a shape of the shading layer 7. On a plurality of the electrodes 3a, a plurality of pixel areas A1 is equidistantly spaced apart from each other. Further on the electrodes 3a, the segments of the shading layer 7 are so formed as to cover areas A2, i.e., the spaces between the pixel areas A1 which are opposed to spaces between the electrodes 3b formed on the glass substrate 2 opposed to the glass substrate 1. As in the same manner, the segments of the other shading layer 7 is formed on the electrodes 3b.

As described above, according to the first embodiment, the shading layer 7 completely shades the light penetrating the areas A2, i.e., the spaces between the pixel areas A1, whereby all the areas A2 in the display screen of the liquid crystal display device 10 can have the substantially same brightness. This can remarkably improve the liquid crystal display device 10 in display quality thereof.

Figure 3:
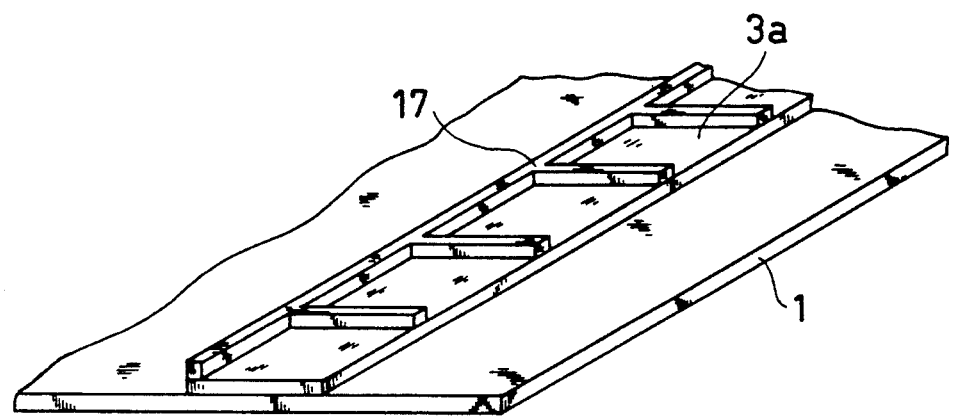
FIG. 3 is a perspective view showing a glass substrate of the second embodiment of a liquid crystal display device in accordance with the invention.
Figure 4:
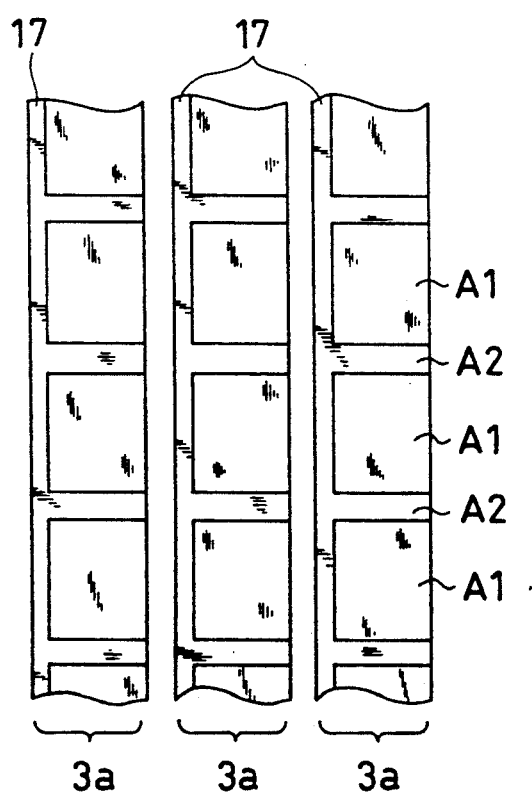
FIG. 4 is a plan view showing a shape of a shading layer in the second embodiment of the liquid crystal display device in accordance with the invention.

FIG. 3 is a perspective view showing a glass substrate 1 in the second embodiment of a liquid crystal display device in accordance with the invention. FIG. 4 is a plan view showing a shape of a shading layer 17. A construction of this embodiment is similar to that of the first embodiment, and the same reference numerals as in the first embodiment are used to denote corresponding members of the second embodiment.

This embodiment is characterized by the shape of the shading layer 17 formed on the electrodes 3a, as shown in FIG. 4. That is, the shading layer 17 is so formed as to cover not only the areas A2 being the space between the pixel areas A1, but also one longitudinal end portion of each of the electrodes 3a. On the electrodes 3b, the other shading layer 17 is formed as in the same manner on the electrodes 3a.

As described above, according to the second embodiment, the shading layer 17 completely shades light penetrating the areas A2 in the spaces between the pixel areas A1, whereby all the areas A2 in the display screen of the liquid crystal display device can have the substantially same brightness. Further, by forming the shading layer 17 of a molybdenum film having smaller resistance than the electrodes 3a and 3b along the longitudinal direction of each of the electrodes 3a and 3b, voltage applied to one end of each of the electrodes 3a or 3b does not decrease at the other side, so that the same voltage can be applied to each of the pixel areas A1. Thus, the display properties of the liquid crystal display device can be uniformed thereby remarkably improving in the display quality thereof.

Figure 5:
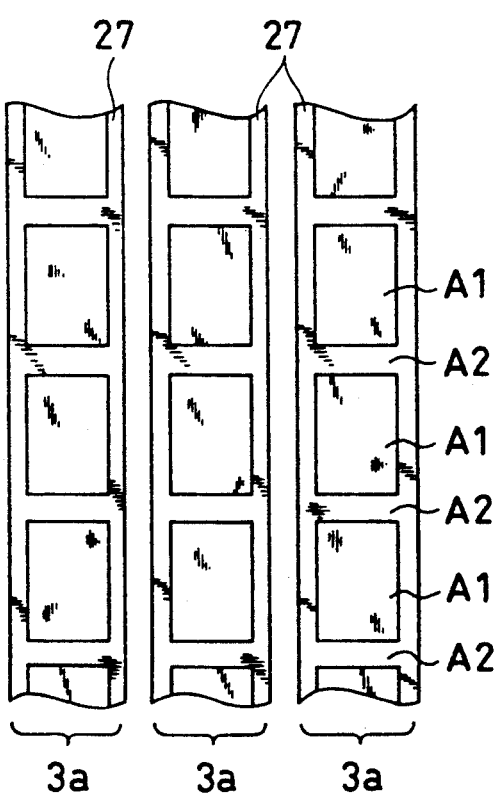
FIG. 5 is a plan view showing a shape of a shading layer in the third embodiment of a liquid crystal display device in accordance with the invention.

FIG. 5 is a plan view showing a shape of a shading layer 27 in the third embodiment of a liquid crystal display device in accordance with the invention. A construction of this embodiment is similar to that of the first embodiment, and the same reference numerals as in the first embodiment are used to denote corresponding members of the third embodiment.

This embodiment is characterized by the shape of the shading layer 27 formed on the electrodes 3a, as shown in FIG. 5. That is, the shading layer 27 is so formed as to cover not only the areas A2 being the spaces between the pixel areas A1, but also both longitudinal end portions of each of the electrodes 3a. On the electrodes 3b, the other shading layer 27 is formed as in the same manner on the electrodes 3a. This embodiment enjoys similar effects to that in the second embodiment recited above.

It is to be understood that the present invention is not limited to the embodiments as described above. Besides molybdenum compound, a material useful for the shading layer in the invention may be any material having both shading and conductive properties, for example, titanium, aluminum, tantalum or like compound. The thickness of the shading layer may be decided depending on electrical resistivity of a material used and on a panel size. Further, methods of forming the shading layer and electrodes are not necessarily those in the embodiments. For example, CVD, or the like may be used therefore. Also, although a selective etching is effected for the patterning process in the embodiments, it is possible that, after etching the ITO film to be patterned, a film to be the shading layer may be formed and then etched. A material useful for the insulating layer is not limited to $SiO_2$. $TiO_2$ (titanium oxide), $Ta_2O_5$ (tantalum oxide), or the like, for example, may be subjected to sputtering or CVD to form the insulating layer. As well, a solution containing one of these materials may be spin-coated, then baked to form a thin film as the insulating film. In addition, the orientation film may be formed by using a polyimide or polyamide resin. The orientation film may be also made of a silane coupling agent. The film may be a LB(Langmuir-Blodgett) film or the like.

According to the present invention, light penetrating the areas other than the pixel areas is shaded by the shading layer, so that all the areas other than the pixel areas become equal in brightness, and that the difference in brightness between the pixel areas and other areas becomes significantly great. Further, by forming the shading layer having conductivity so as to cover the longitudinal end portions of each of the belt-like electrodes, voltage having been applied to one end of electrodes can hardly decrease at the other side, whereby substantially the same voltage can be applied to each of pixel areas. Thus, uniform display properties can be obtained to remarkably improve the liquid crystal display device in display quality thereof.

What is claimed is:

1. A method of forming a liquid crystal display device having improved brightness contrast between a matrix of pixel areas and areas of the device other than the pixel areas, comprising the steps of:

providing two light transmissive substrates formed of glass;

applying a transparent film of conductive material on a surface of each substrate, said conductive material being formed of indium tin oxide;

applying to the conductive material on each substrate a material for forming a shading layer, said shading layer material comprising molybdenum;

removing portions of said shading layer material and said film of conductive material on each substrate to form a plurality of shading layer segments and a plurality of electrodes with the shading layer segments overlying respective portions of the electrodes;

applying an insulating layer over said shading layer segments and said electrodes;

securing said substrate in opposition to each other with the electrodes and the shading layer segments of each substrate forming pixel areas and areas other than pixel areas shaded by said shading layer segments whereby said shading layer segments inhibit penetration of light into and afford uniform brightness in said other areas upon operation of the device; and disposing ferroelectric liquid crystals in the space between said substrates;

the step of removing portions of said shading layer molybdenum material including etching said molybdenum material portion with a phosphoric acid etchant and the step of removing portions of said indium tin oxide including etching said indium tin oxide with a hydrochloric acid etchant.

2. A method according to claim 1 wherein the step of removing portions of said shading layer material and said film conductive material is performed sequentially with said shading layer material portions being removed first.

3. A method according to claim 1 wherein the step of applying an insulating layer includes applying a silicon dioxide film to said etched shading layer segments and said electrodes.

4. A method according to claim 1 including applying an orientation coating selected from the group consisting of a polyvinyl alcohol solution, a polyimide resin or a polyamide resin to the insulating layer of silicon dioxide film.

5. A method according to claim 1 wherein the molybdenum material has an electrical resistance less than the electrical resistance of said electrodes.

6. A method according to claim 1 wherein the step of applying an insulating layer includes applying a layer of material selected from the group consisting of titanium oxide or tantalum oxide to said etched shading layer segments and said electrodes.

* * * * *